US008011582B2

(12) United States Patent
Ghafarzadeh

(10) Patent No.: US 8,011,582 B2
(45) Date of Patent: Sep. 6, 2011

(54) VOTING SYSTEM

(76) Inventor: Mohamad Reza Ghafarzadeh, Portland, OR (US)

( * ) Notice: Subject to any disclaimer, the term of this patent is extended or adjusted under 35 U.S.C. 154(b) by 0 days.

(21) Appl. No.: 12/426,643

(22) Filed: Apr. 20, 2009

(65) Prior Publication Data

US 2009/0230192 A1 Sep. 17, 2009

Related U.S. Application Data

(63) Continuation of application No. 11/621,089, filed on May 18, 2007, now abandoned.

(51) Int. Cl.
*G06K 17/00* (2006.01)

(52) U.S. Cl. ....................................................... 235/386

(58) Field of Classification Search .................. 235/386, 235/51–56

See application file for complete search history.

(56) References Cited

U.S. PATENT DOCUMENTS

| | | | | |
|---|---|---|---|---|
| 6,540,138 | B2 * | 4/2003 | Hall et al. | 235/386 |
| 6,892,935 | B2 * | 5/2005 | Weiss | 235/51 |
| 7,054,829 | B2 * | 5/2006 | Campo et al. | 705/12 |
| 2003/0052160 | A1 | 3/2003 | Glover | |

OTHER PUBLICATIONS

USPTO, Office Action mailed Oct. 7, 2008.
Schwabe, Williamson & Wyatt, P.C., Response to Oct. 7, 2008 Office Action filed Dec. 24, 2008.
USPTO, Final Office Action mailed Mar. 23, 2009.
Sequoia AVC Edge Touch Screen Voting Machine, 1999, http://www.accessclarkcounty.com/depts/election/English/Pages/votemach.aspx.
Ghafarzadeh, M. Reza, "This I Believe—Age Group 50-65; Themes: Freedom", Jan. 11, 2007, 2 pages, Portland, Oregon.

* cited by examiner

*Primary Examiner* — Seung H Lee
(74) *Attorney, Agent, or Firm* — Schwabe, Williamson & Wyatt, P.C.

(57) ABSTRACT

This system includes modified ATM machine, resetting machine and voter's log. This system integrates the stages of voter's verification, casting, collecting votes, prevents voter's fraud, has safeguard in place to prevent multiple voting, creates hard copy for possible recount, and verifies that every vote counts and counts correctly without exposing the selection of candidate to any person other than the voter. This system tracks and verifies votes in four different ways. 1st by hard copy of the votes, 2$^{nd}$ by ATM machine 3$^{rd}$ by resetting card machine and 4$^{th}$ by voters log. This system also provides security and prevents voting fraud by taking picture of the voter while voting. It also places a flag on the record of voter after casting a vote which prevents duplicate voting. This system will also print a hard copy which will be kept as a backup for possible recount. The voter selects the language to be displayed for voting therefore will be less confusion while voting.

13 Claims, 11 Drawing Sheets

Flow Diagram of verifying voter's eligibility

Flow Diagram of the voting system

Flow Diagram of uploading eligible voters' list

Flow Diagram of verifying voter's eligibility

Flow Diagram of manual approval

Flow Diagram of the casting vote

Flow Diagram of the casting vote

Flow Diagram of the Resetting machine

Flow Diagram of the Transmit of election results to election headquarter

Drawing shows voter votes through ATM machine

Resetting machine

Drawing shows resetting machine & voting card

Voters' log

| Name | Identification # | Signature |
|---|---|---|
| John Dowe | 123456 | |

Fig. 10

Drawing shows voters log

VOTING SYSTEM

CROSS-REFERENCES TO RELATED APPLICATIONS

This present application is a continuation of U.S. patent application Ser. No. 11/621,089 filed May 18, 2007 entitled, "ELECTION—VOTING SYSTEM." The specification of said application is hereby incorporated in its entirety for all purposes, except for those sections, if any, that are inconsistent with this specification.

TECHNICAL FIELD OF THE INVENTION

This invention relates to voting system, and more particularly a system that prevents fraud, it creates hard copy. It takes a picture of voter while voting. It will facilitate more voting booths therefore more people will be able to vote. It will also ensure that every vote counts and counts correctly.

BACKGROUND OF THE INVENTION

Presently votes are casted through either electronic voting machines, by mail, punch card system or scanners. Each of these systems has their own problems.

Electronic voting machines do not create hard copy for possible recount. Punch card systems and scanner systems are difficult to use and prone to confusion and misuse and fraud. Vote by mail system is susceptible to fraud.

NY times online article dated Nov. 26, 2006 with the heading "Experts Concerned as Ballot Problems Persist" stated that after six years of technological research, and more than $4 billion spent by Washington, we are far from ensuring that every vote counts.

With the current system government has to spend billions of dollars more.

The election results need to be returned within one day. The system needs to have the people's confidence that the every vote counts and counts correctly.

The hard copy requirement is particuady essentia because voters can see their votes not only electronically but aso as a hard copy. The hard copy needs to be stored and kept for 30 days in case recount is needed. Consequently peope will have more trust in the election system.

The system shoud be able to run in more than one language.

SUMMARY OF THE INVENTION

The cost of this system is only about $200 million dollars for each national election compared to billions of dollars with the current system that government spent so far.

Government will save billions of dollars by not having to purchase the voting machines or pay for their maintenance while the voting machines are not in use to ensure that they will work properly on Election Day.

ATM machines are maintained regularly by banks. Banks pay for the maintenance of ATM machines with no cost to the government.

Government only will pay a transaction fee to banks for every vote casted. Total transaction fee and cost to the government is about $150 to $200 million dollars for each national election.

This system produces a hard copy after casting each vote for possible recount. The picture of the voter is also taken to prevent possibility of election fraud.

At the election time In each modified ATM machine location will be 2 election officials (poll workers).

The voters select the language to be displayed on the ballots.

$1^{st}$ component is uploading of the list of eligible voters into the participating banks ATM systems databases.

$2^{nd}$ component is the registration system (voter's log). The voter, once qualification is approved, the election official collect the voter's name and signature in the log.

A $3^{rd}$ component is voting card. After voter's qualification is confirmed, the election official gives the voter an election voting card.

$4^{th}$ component is modified ATM machine. Voter will then inserts the Voting card in the modified ATM station. ATM station with a built in computer-based interactive graphic interface permit the voter to cast vote through touch screen.

$5^{th}$ component is voter's identification number.

Voter will enter his/her identification number (example Social Security number or the number that was provided by the election headquarter, etc.) in the ATM machine. Modified ATM station accesses the bank's ATM database to verify voter's eligibility.

If voter's eligibility is not verified and specific county allows manual approval election official re-verifies the voter's identifications to make sure voter is eligible to vote. If eligible, election official will insert the supervisory card in the ATM machine and will enter the supervisory code then will enter the voter's name, address and social security number. ATM will record the voter's information in its database.

After eligibility of the voter is verified on screen prompts for preference English or Spanish? The following screen will display either in English or Spanish based on the selection. A prompt shows are you ready to vote ? The following screen shows the list of potential parties and candidates within the political parties. After the voter make his/her selection a prompt asks the voter to confirm his/her selection by touch ok button. If voter touch the no button it will go back to the previous screen. After confirmation is complete the ATM machine will print out a ballot/receipt with the name of the printed name of the selected candidate.

After verifying the printed information, the voter will place the ballot in the blank envelope and will seal it.

The voter will then place the sealed envelope in 2nd envelope.

After signing and sealing the envelope, voters will insert the envelope into the ATM machine.

ATM machine will add one to the cumulative total of people voted.

ATM machine copies the voter's name and social security number to the tape on the back of the voting card. The ATM machine will print the voter's name and identification on the envelope.

ATM machine will take a picture of the voter.

ATM ejects the voting card. Voter will return the card to the ballot worker.

$6^{th}$ component is resetting machine. Election official swipes the card in the resetting machine.

The resetting machine after capturing the voter's name and social security number will add one to the counter, erase the information and reset the card.

Poll worker will forward the card to the next voter to vote.

Card has to be reset to be able to work for the $2^{nd}$ time. Otherwise the next voter would not be able to use the card for voting.

After the election is over and the poll is closed this information along with all of the election results will be transferred from the bank's ATM database to the election 'headquarters' database). When data is received by election headquarters, it places a flag on the record of each of the voters received in its database. The flag indicates that specific voter casted his/her vote. Once a flag is placed on a voter's record database would not accept another vote for the same person.

The election headquarters' database will then produce a list of individuals with more than one vote. This list will be forwarded to the legal department for legal action against those who voted more than once. Accordingly this system will prevent any multiple voting.

Banks will also transfer the envelopes to the election headquarters for possible recount.

Tabulation on each of the modified ATM machines will be held by keeping the cumulative results of all the people who have voted using the specific modified ATM machine. Total number of votes reported by the bank on the specific modified ATM terminal should match the number of signatures collected in the voter's registration log in that location. That number should match the number of voters that has been captured by the resetting machine, and also should match the number of votes in the envelopes delivered by the bank.

It is further technical advantage of this invention that each modified ATM machine in the voting system is responsive to an external information keyed card for activation and for selection of the various choices available to the voter.

BRIEF DESCRIPTION OF THE DRAWINGS The following drawings will bring more clarification and complete understanding of this invention by referring to the detail description and claims.

FIG. 1 discloses the voting system in perspective.

FIG. 10 illustrates voters'log.

DETAILED DESCRIPTION OF THE INVENTION

Figure 1:
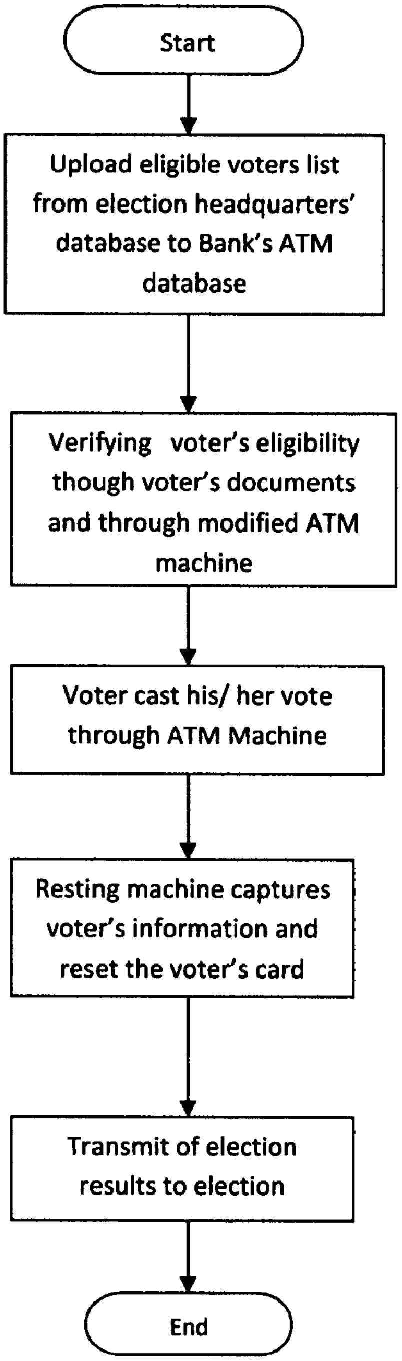

FIG. 1 depicts the election voting system. It shows uploading of the list of eligible voters into the participating banks ATM systems databases. Poll workers will provide a voting card to the voter. After voter's qualification is confirmed voter cast his/her vote. Then voter will return the card to the poll worker. Poll worker will swipe the card through resetting machine. Resetting machine captures voters' information from back of the card and will reset the card. After the election is over participating banks will transmit the election results to the election headquarter.

Figure 2:
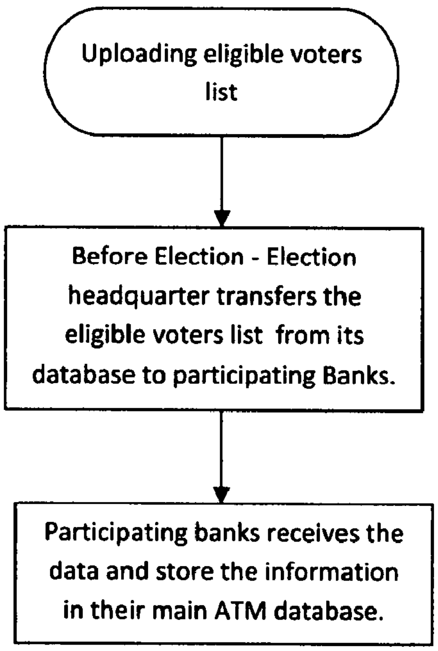
FIG. 2 depicts the uploading eligible voters' list.

FIG. 2 illustrates a method for uploading eligible voters list. Election headquarter transfers the eligible voters list to databases of the participating banks. Participating banks receive the data and store the information in their main ATM database.

Figure 3:
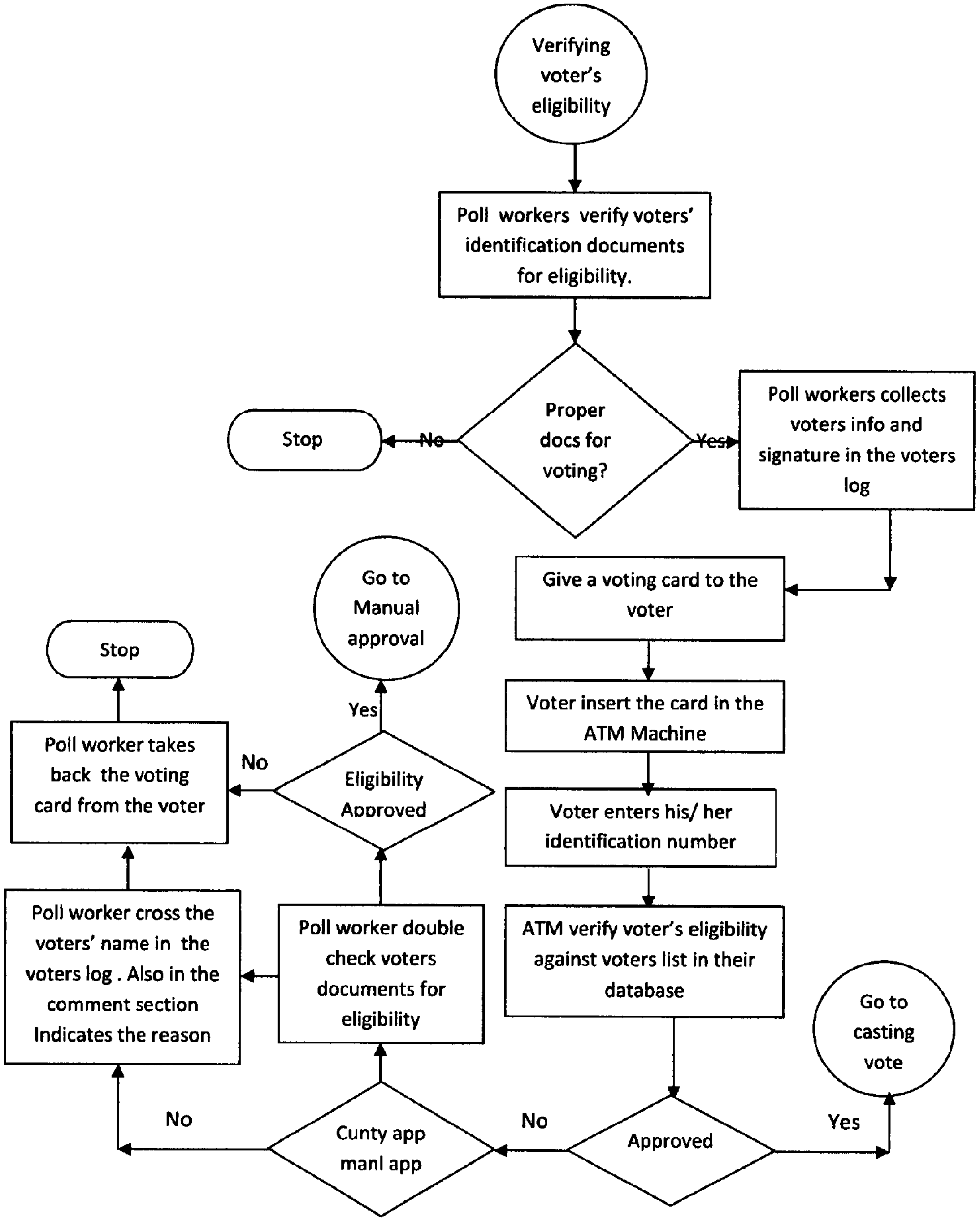
FIG. 3 Illustrates verification of the voters' eligibility.

FIG. 3 depicts verifying voters' eligibility. Poll worker verify voters' identification for eligibility.

If the voter does not have proper documents would not be able to vote. If voter has proper documents poll worker collects voter's name and signature in the log and will give the voter the voting card.

Voter will insert the card in the ATM machine. Voter enters his/her identification number. ATM verifies eligibility against voters list in their database.

If name found in the ATM database, will proceed with voting.

If name not found in the ATM database and county does not approve manual approval, poll worker will cross the voter's name in the voter's log and will indicate in the comment section of the reason that was crossed out. Then poll worker will take back the voting card from the voter.

If county approve manuel approval, poll worker double check voters documents for eligibility if approved goes through manual approval. If not approved poll worker will cross the voter's name in the voter's log and will indicate in the comment section of the reason that was crossed out. Then poll worker will take back the voting card from the voter.

Figure 4:
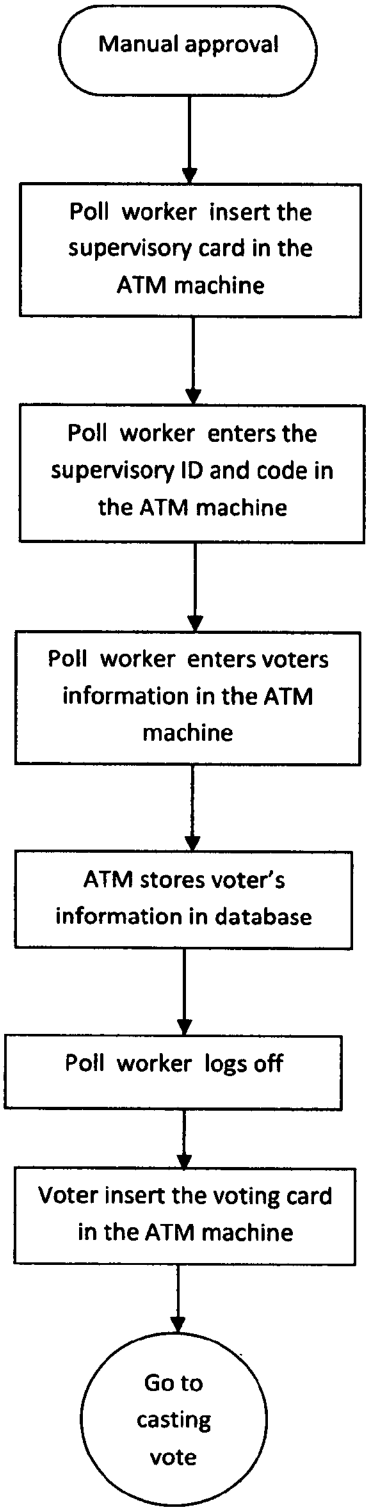
FIG. 4 Illustrates manual approval.

FIG. 4 illustrates manual approval. Poll worker inserts the supervisory card in the ATM machine. Poll worker enters the supervisory ID and supervisory code in the ATM machine. Poll worker enters voter's information in the ATM machine. ATM stores voters' information in it's database. Poll worker logs off. Voter then will insert the voting card in the ATM machine.

Figure 5A:
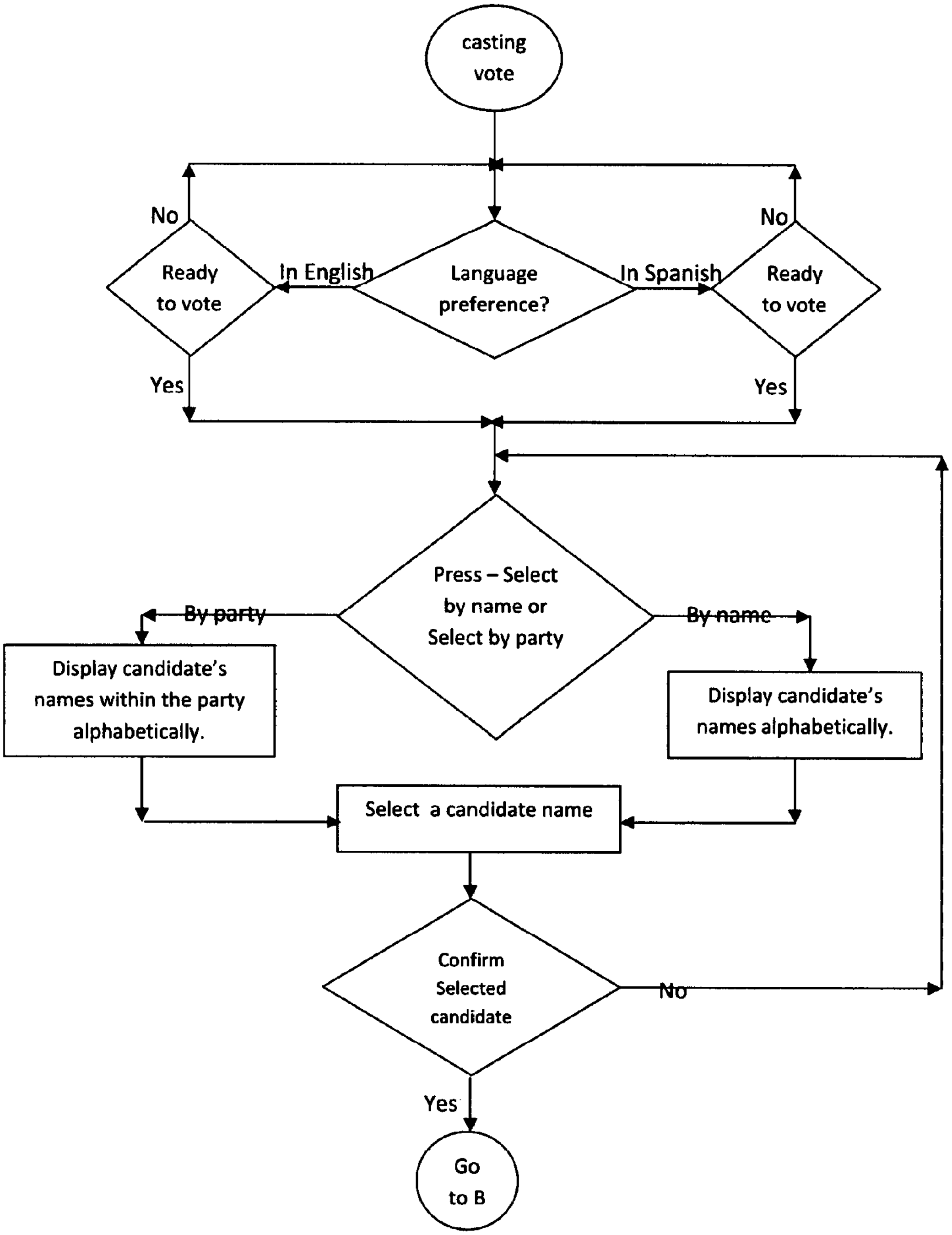
FIGS. 5A and 5B shows diagram of casting vote.

FIG. 5A shows flow diagram of casting vote. A prompt ask for the input of the language preference. English or Spanish. Based on the language selection the following screens will display with the language selected. Press - Select by name or Select by party. If by name is selected, ATM will display 'the candidates' names alphabetically. If by party is selected, the ATM will display the 'candidates' names within the party alphabetically. After selecting a candidate a prompt asks for confirmation of the selected candidate.

If not confirmed it goes back to select by name or party prompt.

Figure 5B:
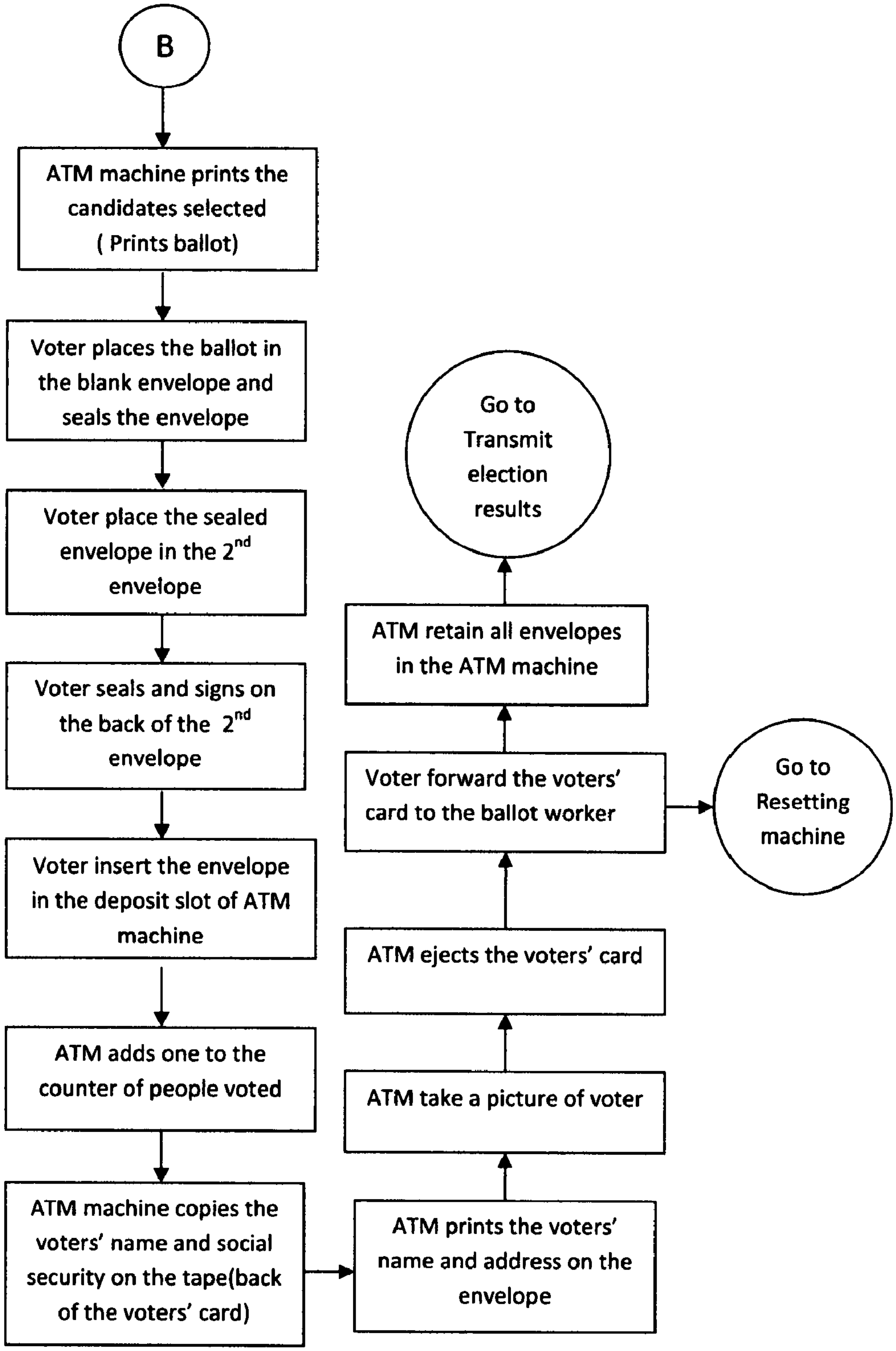

FIG. 5B illustrates the flow after the voter's selection is confirmed. After the selection is confirmed ATM prints the candidate's name. Voter will place the printout (ballot) in the envelope and will seal that envelope.

Voter then will place the sealed envelope in the $2^{nd}$ envelope. Seal the $2^{nd}$ envelope. Will sign on the back of the envelope and will insert the envelope in the deposit slot of the ATM machine.

At that point ATM will add one to the counter of the people voted. ATM machine copies the voters' name and social security number on the tape that is on the back of the voters card.

ATM prints the name and address of the voter on the envelope.

ATM machine will take a picture of the voter.

ATM machine eject the voters' voting card.

Voter retrieves the card and will forward that to the ballot worker.

ATM machine will retain the envelope inside the ATM machine.

Figure 6:
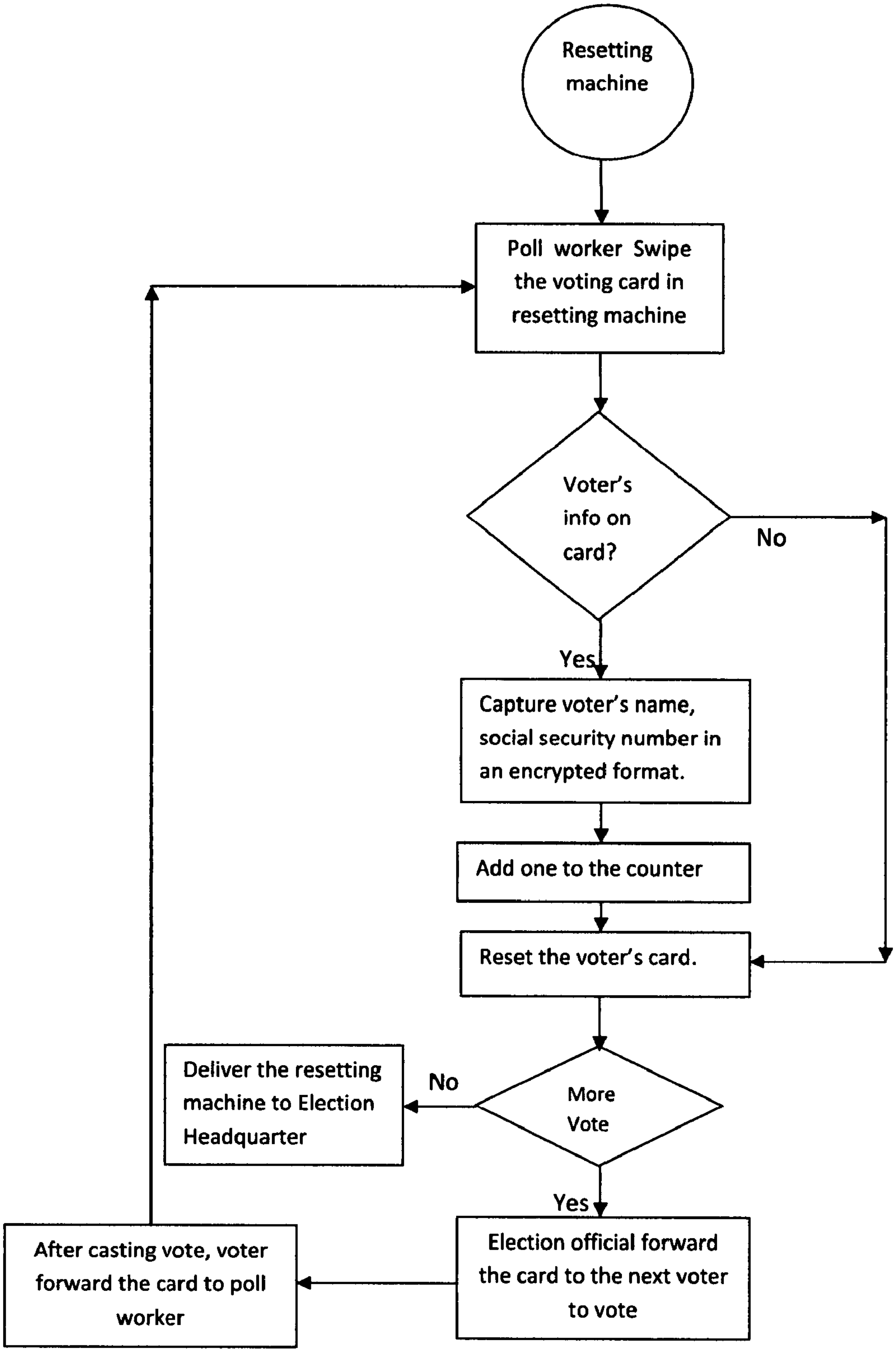
FIG. 6 Illustrates diagram of the resetting machine.

FIG. 6 illustrates the flow of Resetting machine. Poll worker swipes the voting card through resetting machine.

If the resetting machine detect the voter's information it will capture the name and social security number and stores them in the encrypted format in the resetting machine. If no information is available it will reset the card.

Then will add one to the counter will reset and delete the information on the card. If there are no more voters poll worker will deliver the resetting machine to the election headquarter.

If there are more voters, poll worker will forward the card to the next voter to vote.

Voter after completing voting will forward the card to the poll worker.

Poll worker then will swipe the voting card in resetting machine again.

Figure 7:
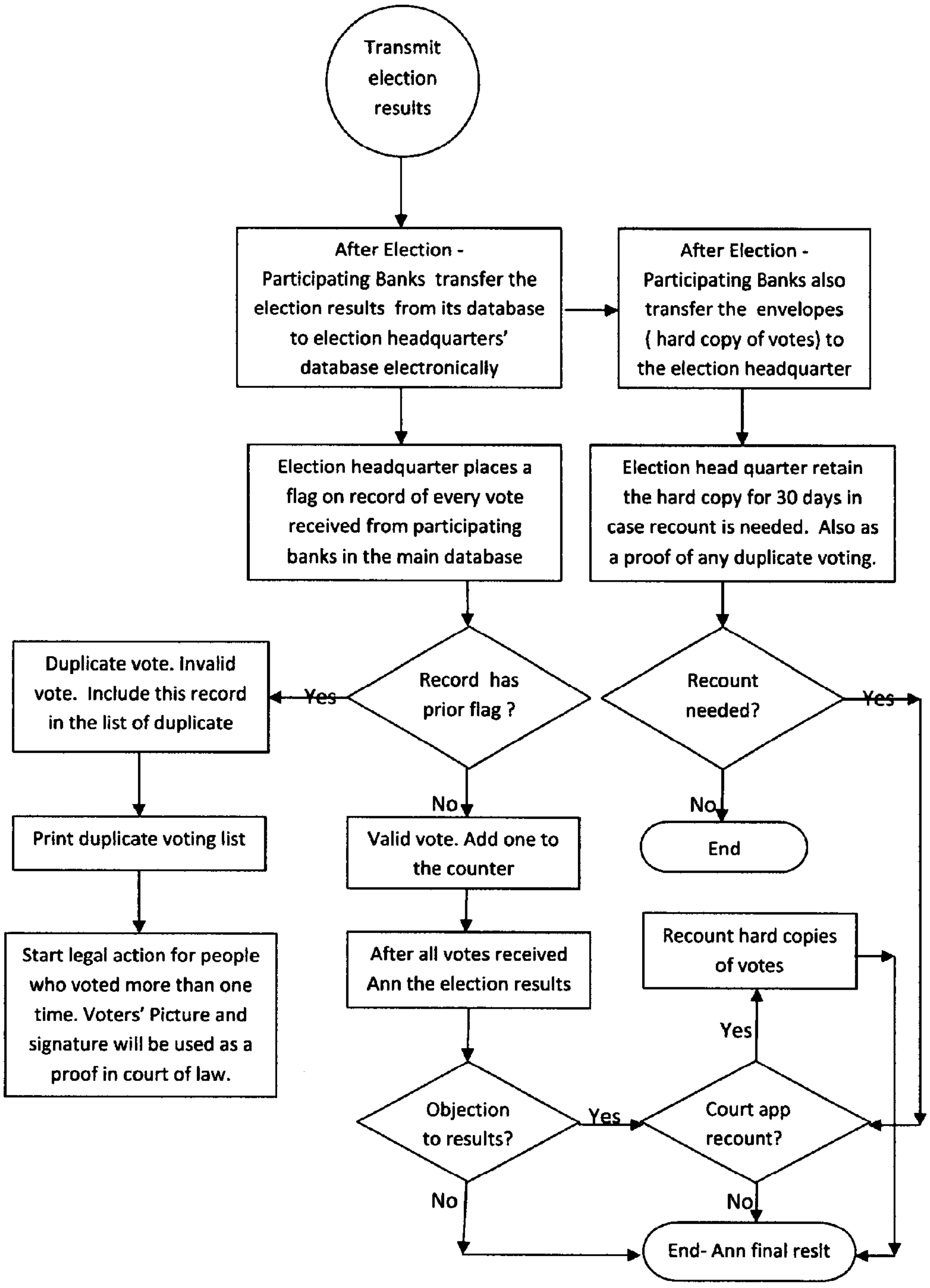
FIG. 7 Illustrates the transmission of election results to election headquarter.

FIG. 7 illustrates the transmission of the election results. After election participating banks will transfer the votes from their database to election headquarters' database electronically.

Election headquartes while receiving teh votes will place a flag on the record of voters who voted in their main database.

While receiving the votes if any voter has prior flag in their record and another vote is coming from the same voter, election headquarters will include the voter's information in the duplicate voters list.

ATM will print the duplicate voting list.

The next step is start the legal action for people who voted more than one time. Voter's picture that ATM is taking while voting and voter's signature will be used as a proof against the voter in the court of law.

If record does not have a prior flag it will add one to the counter of people voted. Then they will announce the election results. If no objection to the results the announcement results are final.

If objection to the election results and courts will approve the recount then they will recount the votes inside the envelopes. Then they will announce the election results.

Otherwise the election results are final.

Figure 8:
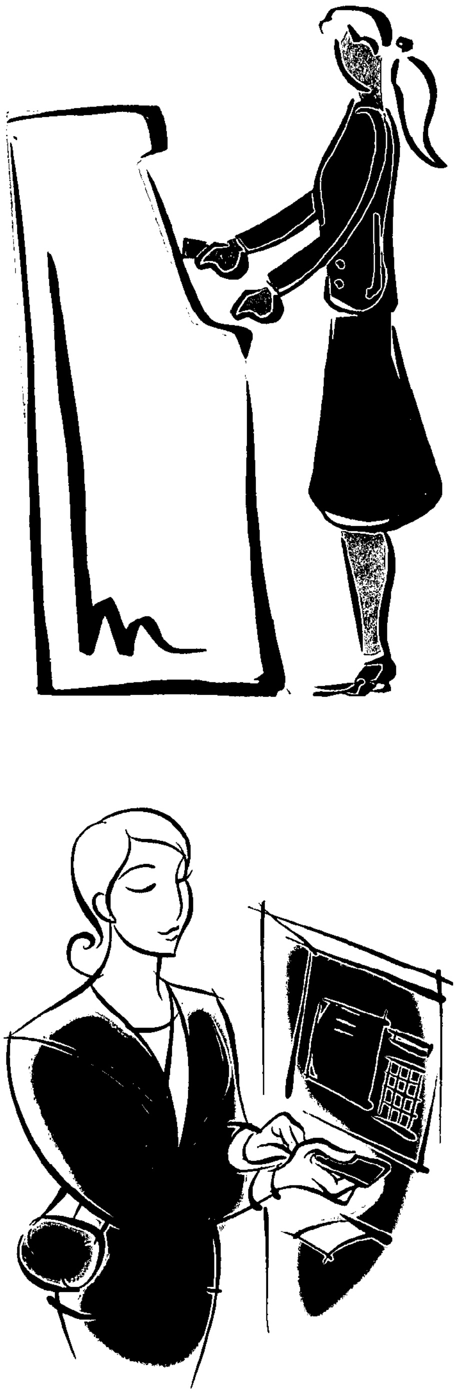
FIG. 8 illustrates voter voting through ATM machine.

FIG. 8 shows voter votes through ATM machine.

Figure 9:
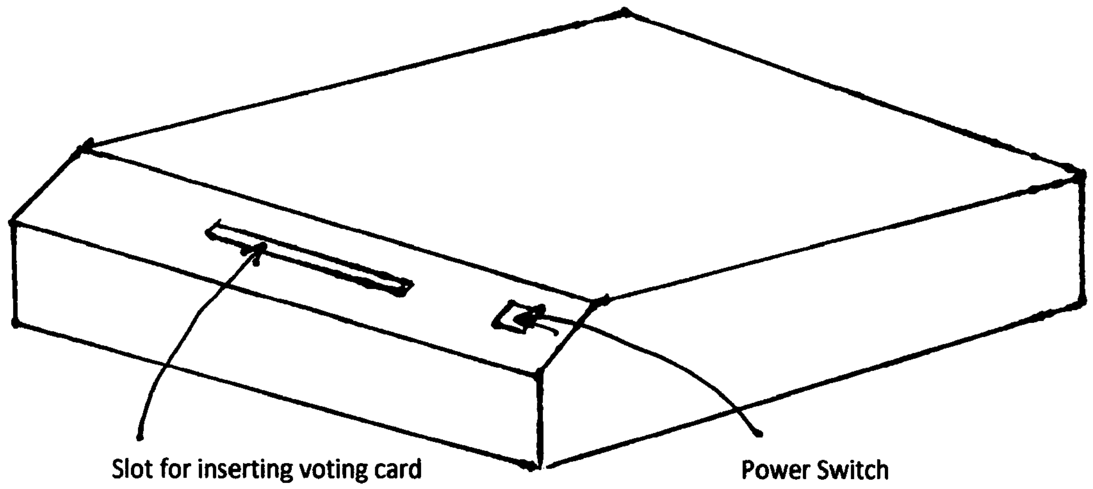
FIG. 9 illustrates resetting machine and voting card.
Figure 9:
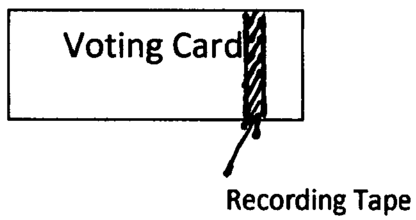

FIG. 9 shows a resetting machine and a voting card.

FIG. 10 shows a voters' log. It shows a log of voters that includes name, identification number and signature of the voter.

DESCRIPTION OF THE PREFERRED EMBODIMENT

With reference now to the drawings thereof,the new and improved voting system will be more reliable because it not only generates a hard copy as a backup, it provides a checks and balances between the banks and election headquarter.

More particularly a system that prevents fraud, it creates hard copy. It takes a picture of voter while voting. It will facilitate more voting booths therefore more people will be able to vote. It will also ensure that every vote counts and counts correctly.

This system tracks and verifies votes in four different ways. 1st by hard copy of the votes, $2^{nd}$ by ATM machine $3^{rd}$ by resetting card machine and $4^{th}$ by voters log. This system also provides security and prevents voting fraud by taking picture of the voter while voting. It also places a flag on the record of voter after casting a vote which prevents duplicate voting. This system will also print a hard copy which will be kept as a backup for possible recount.

The voter selects the language to be displayed for voting therefore will be less confusion while voting.

Also since we will be able to utilize tens of thousands of ATM machines for voting, it will create convenience for the voters to vote. Therefore more people will vote in elections.

I claim this system comprising the following elements:

1. A method comprising:
receiving, at a voting machine, a voting card;
verifying voter eligibility based at least in part on information received from a user interface of the voting machine;
receiving a selection corresponding to a vote from the user interface;
printing a receipt indicating the selection;
receiving an envelope with the printed receipt; and
incrementing a cumulative total number of voters based at least in part on said receiving of the envelope.

2. The method of claim 1, further comprising:
recording voter information, including a name or an identification number associated with a user, on the envelope.

3. The method of claim 1, further comprising:
receiving, at the voting machine, a list of eligible voters; and
said verifying voter eligibility through a comparison of the information received from the user interface to the list of eligible voters.

4. A method comprising:
receiving, at a voting machine, a voting card;
verifying voter eligibility based at least in part on information received from a user interface of the voting machine;
receiving a selection corresponding to a vote from the user interface;
printing a receipt indicating the selection;
receiving an envelope with the printed receipt; and
capturing an image of a user at the voting machine based at least in part on said receiving of the envelope.

5. A method comprising:
receiving, at a voting machine, a voting card;
verifying voter eligibility based at least in part on information received from a user interface of the voting machine;
receiving a selection corresponding to a vote from the user interface;
printing a receipt indicating the selection;
receiving an envelope with the printed receipt; and
copying at least a portion of the information received from the user interface to the voting card.

6. The method of claim 5, wherein said copying comprises:
copying a name and identification number associated with a user of the voting machine.

7. The method of claim 5, wherein said copying is done by the voting machine and the method further comprises:
receiving, at a resetting machine that is separate and distinct from the voting machine, the voting card after said copying of at least the portion of the information received to the voting card;
capturing, by the resetting machine, at least the portion of the information from the voter card; and
incrementing, by the resetting machine, a voter counter based on said capturing.

8. The method of claim 7, further comprising resetting, by the resetting machine, the voter card.

9. A voting machine comprising:
a first input configured to receive a voting card;
a user interface configured to receive information associated with a user of the voting machine and to receive a selection corresponding to a vote;
a controller configured to verify voter eligibility based at least in part on the information received from the user interface;
a printer to print a receipt indicating the selection; and
a second input configured to receive an envelope with the printed receipt;
wherein the controller is further configured to increment a cumulative total number of voters based at least in part on the envelope being received at the second input.

10. The voting machine of claim 9, wherein the controller is further configured to record voter information, including a name or an identification number associated with the user, on the envelope.

11. The voting machine of claim 9, further comprising:

an interface configured to receive a list of eligible voters; and the controller being configured to verify voter eligibility by comparing the information received from the user interface to the list of eligible voters.

12. The voting machine of claim 9, wherein the voting machine is an automated teller machine.

13. A voting machine comprising:

a first input configured to receive a voting card;

a user interface configured to receive information associated with a user of the voting machine and to receive a selection corresponding to a vote;

a controller configured to verify voter eligibility based at least in part on the information received from the user interface;

a printer to print a receipt indicating the selection;

a second input configured to receive an envelope with the printed receipt; and a camera configured to capture an image of a user at the voting machine based at least in part on the envelope being received at the second input.

* * * * *